Aug. 30, 1932.  C. H. HOOK ET AL  1,874,293
COMBINATION PRESSURE REGULATING AND SHUT-OFF VALVE
Filed Feb. 3, 1930
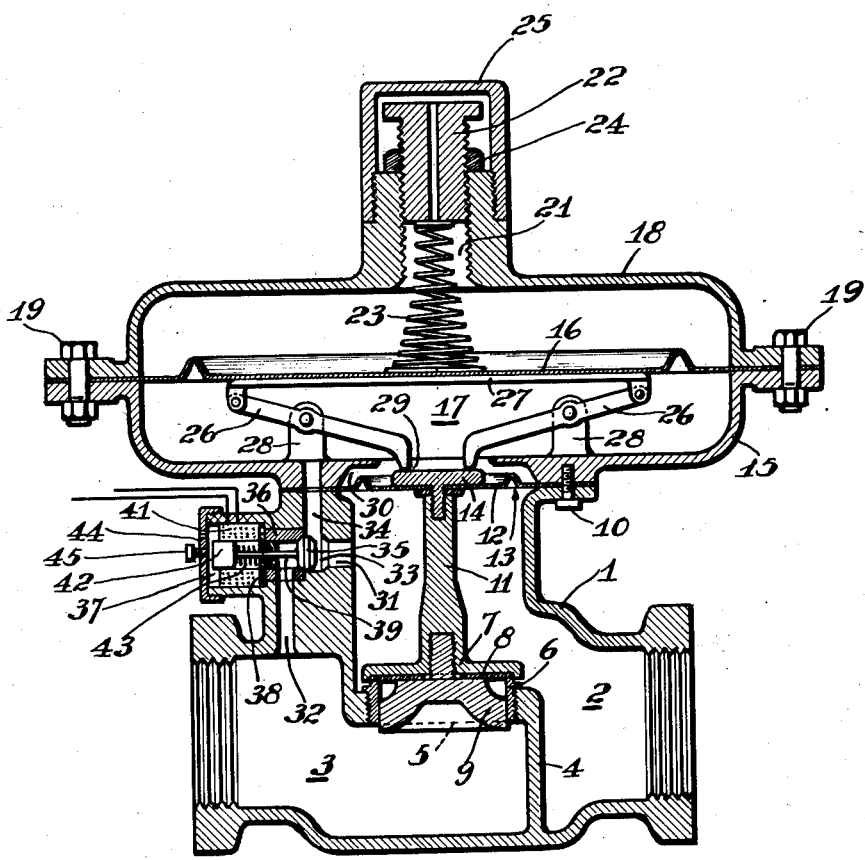
WITNESSES
INVENTORS
Charles Howard Hook and
Nathan L. Mercur
by Brown & Critchlow
their Attorneys Patented Aug. 30, 1932

1,874,293

UNITED STATES PATENT OFFICE

CHARLES HOWARD HOOK, OF PITTSBURGH, AND NATHAN L. MERCUR, OF McKEESPORT, PENNSYLVANIA

COMBINATION PRESSURE REGULATING AND SHUT-OFF VALVE

Application filed February 3, 1930. Serial No. 425,409.

This invention relates to a combination valve mechanism in which a single valve is adapted to function as both a pressure regulator and a positive shut-off valve.

In a prior application entitled "Pressure regulating and shut-off valve," filed in the United States Patent Office June 28, 1928 under Serial No. 289,026, by the present inventors, there is illustrated and described what is believed to be the first incorporation in an integrally constructed valve mechanism of a single valve capable of being selectively operated as either a pressure regulating or a positive shut-off valve.

The chief advantages of such a valve mechanism are that it reduces the number of valves normally used for performing these functions by one and practically cuts both the cost of the apparatus and the cost of their installation in half, since it necessitates the connection of only one structure in a pressure system instead of two. It also eliminates any pressure drop through a separate shut-off valve when it is adapted to function as a pressure regulator, and in addition to that it confines the control and regulation of the flow of fluid through the system to a single element.

The present invention has for its primary object to provide an improved form of structure of the above described character which is adapted to function as a shut-off valve independently of the pressure in the system when it is adjusted to operate as such, and to regulate the pressure in the low pressure side of the system with an extremely high degree of accuracy when adjusted to operate as a pressure regulator.

Another object is to provide a simple and dependable integrally constructed valve mechanism of this character which may be manufactured at a relatively low cost.

Other objects as well as the novel features and advantages of the invention will become more apparent when the following detailed description is read in conjunction with the accompanying drawing. In this drawing the single figure illustrates what is now considered to be the preferred embodiment of the invention.

Referring to the drawing in detail, the numeral 1 designates a casing section in which there is provided an inlet chamber 2 and an outlet chamber 3 adapted for the reception of pipe ends for installing the mechanism in the pipe line of a pressure system. Between chambers 2 and 3 there is extended in a diagonal manner a partition 4 containing a valve opening 5 in which a valve seat 6 is fitted. A valve 7 equipped with a packing washer 8 held in place by a follower 9 to make it leak-tight is arranged to fit upon the seat 6. This valve is connected by means of a stem 11 to a thin flexible diaphragm 12 fitted over an opening 13 located in casing section 1 at the top of the inlet chamber. This diaphragm is preferably made of some thin flexible material such as leather, and the valve stem is connected to it by a flat topped screw 14 which is adapted to also form a rigid bearing surface for engaging the ends of levers 26 as will appear hereinafter.

Above diaphragm 12 there is mounted a dish-shaped casing section 15 which is secured to casing section 1 by screw bolts 10 that firmly hold both it and the diaphragm in place. Across the top of this latter casing section there is mounted a second flexible diaphragm 16 which forms with it and a diaphragm 12 a pressure chamber 17. On top of the diaphragm 16 there is mounted a cover casing section 18, the two being held together by bolts 19 which also hold the diaphragm 16 in place. In the top of casing section 18 is a threaded opening 21 there is fitted a screw 22 between which and the top of diaphragm 16 there is arranged a spring 23 for varying the pressure in chamber 17 necessary to effect movement of diaphragm 16. To prevent screw 22 from getting out of adjustment, once it has been set to maintain a certain pressure in chamber 17, it is equipped with a lock nut 24, and over both there is fitted a cap 25 which is adapted to screw onto the top of the cover casing section.

For transmitting to diaphragm 12 and valve 7 the upward displacement produced in diaphragm 16 by the pressure in chamber 17 when it exceeds that impressed on the diaphragm 16 by spring 23 levers 26 are employed. These levers are pivotally connected at their upper ends to a support member 27 mounted on the underside of diaphragm 16, and fulcrumed in support members 29 located near an opening 28 in the bottom of casing section 15 with their lower ends resting on the top of screw 14. The underside of casing section 15 adjacent to the opening 28 is hollowed out at 30 to permit the diaphragm 12 to flex upwardly sufficiently to allow it to open valve 7 and to also make the pressure responsive area on the two sides of diaphragm 12 equal.

For transmitting to the pressure chamber the pressures in the inlet and outlet chambers 2 and 3, passages 31 and 32, respectively, are extended from these chambers to a valve chamber 33 formed in casing section 1 from which a passage 34 extends into the pressure chamber. In the valve chamber 33 there is arranged a double-acting pilot valve 35 for selectively controlling which of the chambers will be connected to the pressure chamber. When the pilot valve is in its innermost position it closes passage 31 shutting off the pressure from the inlet chamber and allowing the pressure in the outlet chamber which is the pressure on the low pressure side of valve 7 to pass by way of passage 32, valve chamber 33, and passage 34, to pressure chamber 17.

When pilot valve 35 is in its outermost position it closes passage 32 and permits the pressure from the inlet chamber 2 to pass by way of passage 31, valve chamber 33, and passage 34 to the pressure chamber 17, making the pressures on the two sides of the diaphragm 12 the same. To insure the closing of valve 7 under these conditions independently of the pressures in the inlet and pressure chambers, the valve and its connections are made sufficiently heavy to cause it to move to its seated position due to its own weight. This is an important feature of the invention as it renders the valve capable of functioning as a positive shut-off valve independently of how low the pressure may be in the inlet chamber.

In order to facilitate the installation of the pilot valve 35, a valve fitting 36 is employed being arranged to fit in an opening 37 extending from the exterior of casing section 1 to the valve chamber 33. This fitting is adapted to register with and form the upper end of passage 32 as well as the outermost seat for valve 35. To prevent leakage about the operating stem 39 connected to the valve 35, a packing gland 38 is mounted in the outer end of this fitting about the valve stem. For effecting the movement of valve 35, although various other means may be readily employed, a solenoid 41 is illustrated here for that purpose. This solenoid is disposed in the outer end of opening 37 which is enlarged for its reception and in it there is arranged for reciprocable movement a magnetic core or armature 42 which is attached to the outer end of valve stem 39. Between the inner face of this core and the outer end of the valve fitting 36 there is arranged a helical spring 43 which normally urges the core to its outermost position and the valve to its seated position over the end of passage 32. When the solenoid is energized, the armature 43 will be moved inwardly carrying valve 35 to its seated position over the end of passage 31. This operation of valve 35, as will be readily appreciated, however, may be easily reversed.

To prevent dust and foreign matter getting into the pilot valve operating mechanism, a cap 44 is arranged to fit on the casing at the outlet end of opening 37. In this cap there may be provided a set screw 45 adapted to be screwed against the outer end of armature 42 to positively force it and the valve 35 to its seated position on the end of passage 31 so that the valve may be operated as a regulating valve without the use of solenoid 41, should the solenoid become inoperable for any reason, or for any reason it should be undesirable to use it.

By way of illustrating the operation of the invention, assume the valve mechanism is connected in a feed line extending from a gas main to a set of gas burners under a boiler, and that it is desired to reduce the pressure from the gas main to the burners and supply it thereto at a constant regulated pressure when the burners are in operation and to positively shut it off when they are not.

With the pilot valve 35 in its normally disposed outermost position and the solenoid 41 deenergized, the pressure from the inlet chamber will be communicated as described above to the pressure chamber 17. This will permit the valve 7 due to its own weight and the difference in pressures on its top and bottom sides to move to its closed position, as under these conditions the pressure in the two sides of the diaphragm 12 will be the same and hence have no effect whatever on the operation of the valve. If the pressure communicated from the inlet chamber to the pressure chamber or from the gas main is greater than the pressure desired to be maintained in the outlet chamber, as determined by the pressure in spring 23, it will force diaphragm 16 upwardly against the resistance of spring 23. This will cause the lower ends of levers 26 to be forced against the top of screw 14 and more securely force valve 7 against its seat. Due to this construction the greater the gas pressure in the gas main the tighter the valve will be seated in the opening 5, thus insuring against leakage at high pressure as well as at low.

When it is desired to turn the gas on in the burners, and transmit it thereto at a reduced and automatically regulated constant pressure, after set screw 22 is adjusted to place such a pressure by means of spring 23 on diaphragm 16 that it will require the desired maximum pressure wanted at the burners to be present in the pressure chamber to force the diaphragm 16 upward sufficiently to cause levers 26 to close the valve 7. Then the solenoid 41 is energized which causes the pilot valve 35 to be moved to its forward position covering passage 31 and opening passage 32, shutting off the pressure from the inlet chamber and placing the outlet chamber 3 in communication with the pressure chamber. When the pilot valve is first moved to this latter position there will be no pressure other than atmospheric pressure present in the pressure chamber 17, consequently the pressure on the underside of diaphragm 12 will be greater than that on its top side. This unbalanced condition will cause diaphragm 12 to be flexed upwardly and valve 7 to be unseated permitting the gas from the main to flow from the inlet chamber through the valve opening in to the outlet chamber and to the burners. As the pressure on the low pressure side of the valve and in the pressure chamber builds up it will overcome the resistance of spring 23 and force diaphragm 16 upward. This in turn will force the lower ends of levers 26 downwardly and close valve 7. The closing of valve 7 is made possible in spite of the greater gas pressure on the underside of diaphragm 12 by reason of the diaphragm 16 having considerably greater area than that of diaphragm 12.

When the desired pressure has been established on the low pressure side of the system, the valve 7 will be closed. When the pressure recedes, spring 23 will force diaphragm 16 downwardly and lift the levers from the top of screw 14 permitting the pressure on the underside of diaphragm 12 to reopen the valve. In this way the desired pressure will be automatically maintained in the low pressure side of the system, and as will be understood this pressure may be changed at will by merely adjusting screw 22. The deenergizing of solenoid 41 will permit the spring 43 to return the pilot valve 35 to its original position to render valve 7 operable as a positive shut-off valve.

While it will be readily understood by those skilled in the art that the device may be used in any pressure system where regulating and shut-off valves are normally used, it is especially recommended for use with gas burning heating systems. In such systems although the pilot valve may be connected in a control circuit for manually controlling its operation from either local or remote positions, it is more particularly intended for use in circuits adapted for automatically controlling it in response to various means such as devices operated automatically by the pressure in the boiler, the heat in a room being heated by the boiler, or in response to any of a number of other devices common to the control of such systems, all of which are well known in the art.

According to the provisions of the patent statutes, we have explained the principle and mode of operation of our invention, and have illustrated and described what we now consider to be its best embodiment. However, we desire to have it understood that, within the scope of the appended claims, the invention may be practiced otherwise than as specifically illustrated and described.

We claim:

1. A combination fluid regulating and shut-off valve mechanism comprising a casing having in it, an inlet chamber, an outlet chamber, and a pressure chamber, said inlet and outlet chambers being connected by a valve opening and said inlet and pressure chambers separated by a movable pressure responsive partition, a valve connected to said movable partition arranged to control the flow of fluid through said valve opening, a pressure responsive element disposed in said pressure chamber, and means operably arranged between said element and said movable partition for closing said valve in response to the movement of said element, said means being adapted to have no effect upon the valve when not forced into engagement with the movable partition by the pressure responsive element.

2. A combination pressure regulating and shut-off valve mechanism comprising a casing having in it, an inlet chamber, an outlet chamber and a pressure chamber, said inlet and outlet chambers being connected by a valve opening and said inlet and pressure chamber separated by a movable pressure responsive partition, a valve operably connected to said movable partition arranged to control the flow of fluid through said valve opening, a pressure responsive element arranged in said pressure chamber, means interposed between said element and said movable partition for transmitting the movement of the element to the partition to close the valve when the pressure in the pressure chamber exceeds a predetermined amount, said means being adapted to have no effect upon the movable partition when the pressure in the pressure chamber falls below said predetermined amount, and means for varying the pressure necessary in the pressure chamber for effecting the movement of the pressure responsive element.

3. A combination pressure regulating and shut-off valve mechanism comprising a casing having in it an inlet chamber, an outlet chamber, and a pressure chamber, said inlet and oulet chambers being connected by a valve opening and said inlet and pressure chambers separated by a movable pressure responsive partition, a valve connected to said movable partition arranged to control the flow of fluid through said valve opening, said valve having sufficient weight to seat itself in the valve opening when the pressure in the pressure chamber is equal to or greater than the pressure in the inlet chamber, a pressure responsive element in said pressure chamber and means interposed between it and said movable partition for transmitting its movement to the partition for urging said valve to its closed position, said pressure responsive element being adapted to close the valve when the pressure in the pressure chamber exceeds a predetermined value, but not to interfere with the closing of the valve when the pressure in the pressure chamber is below said predetermined amount.

4. A combination fluid regulating and shut-off valve mechanism comprising a casing, having in it a pressure chamber, an inlet chamber, and an outlet chamber, said pressure and inlet chambers being separated by a movable pressure responsive partition and said inlet and outlet chambers being connected by a valve opening, a normally closed valve connected to said movable partition arranged to control the flow of fluid through said valve opening, a pressure responsive element arranged in said pressure chamber with means for transmitting its movement to the movable partition when the pressure in the pressure chamber exceeds a predetermined value, said means being adapted to not interfere with the movement of the movable partition when the pressure in the pressure chamber is below said predetermined value, means for communicating the pressures in the outlet chamber to the pressure chamber to render the valve operable as a pressure regulator, and means for communicating the pressure from the inlet chamber to the pressure chamber to render the valve operable as a shut-off valve, and a pilot valve for selecting which chamber will be connected to the pressure chamber.

5. A combination pressure regulating and shut-off valve mechanism comprising a casing having in it an inlet chamber, an outlet chamber and a pressure chamber, said inlet and outlet chambers being connected by a valve opening, and said pressure chamber and one of said other chambers being separated by a movable pressure responsive partition, a normally closed valve connected to said partition and arranged to control the flow of fluid through said valve opening, a pressure responsive element in said pressure chamber, means interposed between it and the movable partition for transmitting its movement to said partition, said means being adapted to close the valve when the pressure in the pressure chamber exceeds a predetermined amount, but not to interfere with the closing of the valve when the pressure in the pressure chamber is below said predetermined pressure, means for varying the pressure in the pressure chamber necessary to move said pressure responsive element, and means for selectively transmitting the pressure in either the inlet or outlet chamber to the pressure chamber to render the valve responsive thereto, whereby rendering it operable as either a pressure regulator or a positive shut-off valve.

6. A combination pressure regulating and shut-off valve comprising a casing having in it a pressure chamber, an inlet chamber and an outlet chamber, a flexible diaphragm forming a partition between said pressure chamber and one of said other chambers, a partition containing a valve opening between said inlet and outlet chambers, a normally closed valve connected to said diaphragm arranged to control the flow of fluid through said valve opening, a larger flexible diaphragm forming a wall in said pressure chamber, means for regulating the pressure necessary in the pressure chamber to move the larger diaphragm, means for transmitting the movement of the larger diaphragm to the smaller one to urge said valve to its closed position, said means being adapted to have no effect upon the movement of the smaller diaphragm when the pressure in the pressure chamber is below a value determined by the pressure regulating means, and means for selectively connecting the pressure chamber to the inlet chamber to render the valve operable as a positive shut-off valve or to the outlet chamber to render it operable as a pressure regulator.

7. A combination pressure regulating and shut-off valve mechanism, comprising a casing containing an inlet chamber, an outlet chamber and a pressure chamber, a movable pressure responsive partition between said pressure chamber and one of said other chambers, a partition containing a valve opening separating said inlet and outlet chambers, a normally closed valve connected to said movable partition arranged to control the flow of fluid through said valve opening, a pressure responsive element in said pressure chamber, means for determining the pressure necessary in the pressure chamber for moving said element, means for transmitting the movement of said element to said movable partition, said means being adapted to have no effect upon the movement of the movable partition when the pressure in the pressure chamber is below the predetermined pressure necessary to the movement of the pressure responsive element, a passage extending from both said inlet and outlet chambers to said pressure chamber, a pilot valve arranged to open and close said passages to determine which chamber will be connected to said pressure chamber, and electro-magnetic means for controlling the operation of said pilot valve.

8. A combinatioin pressure-regulating and shut-off valve mechanism, comprising a casing having in it an inlet chamber and an outlet chamber connected by a flow passage, pressure-responsive means for opening and closing said passage, means for subjecting said pressure-responsive means to the pressure obtaining in the inlet chamber, said pressure-responsive means being adapted when subjected to such pressure to insure closing of said passage independently of the value of the pressure in the inlet chamber, other pressure-responsive means for regulating the pressure in said outlet chamber, and means for controlling said latter pressure-responsive means to regulate the pressure in the outlet chamber.

In testimony whereof, we hereunto sign our names.

CHARLES HOWARD HOOK.
NATHAN L. MERCUR.